United States Patent [19]

Sanders

[11] 4,120,514
[45] Oct. 17, 1978

[54] SAFETY DEVICE FOR TRACTOR-TRAILERS TO PREVENT JACKKNIFING

[76] Inventor: O'Neal Sanders, 7544 South Essex, Chicago, Ill. 60649

[21] Appl. No.: 805,322

[22] Filed: Jun. 10, 1977

[51] Int. Cl.² ............................................. B62D 53/08
[52] U.S. Cl. ................................................. 280/432
[58] Field of Search ...................................... 280/432

[56] References Cited
U.S. PATENT DOCUMENTS

| | | | |
|---|---|---|---|
| 2,462,211 | 2/1949 | Moore | 280/432 |
| 2,959,429 | 11/1960 | Lavelle | 280/432 |
| 3,103,201 | 9/1963 | Owen | 280/432 |
| 3,733,090 | 5/1973 | Keller | 280/432 |
| 3,883,160 | 5/1975 | Meyers | 280/432 |

Primary Examiner—Joseph F. Peters, Jr.
Assistant Examiner—R. Schrecengost
Attorney, Agent, or Firm—Gordon W. Hueschen

[57] ABSTRACT

A tractor-trailer is provided with a jam pin carried by the fifth-wheel coupler which is adapted to be projected up into a jam plate carried by or comprised by the wear plate or weld plate of the semi-trailer which has a slot therein of such length as to limit the angle through which the rig can be articulated to prevent or minimize jackknifing. The jam pin is controlled by control means in the cab so that, when jackknifing is an imminent possibility, the driver can throw the jam pin into operative position and thus eliminate or minimize the possibility of jackknifing.

10 Claims, 5 Drawing Figures

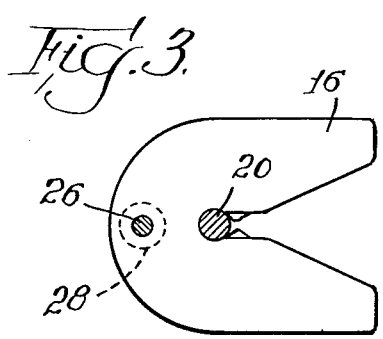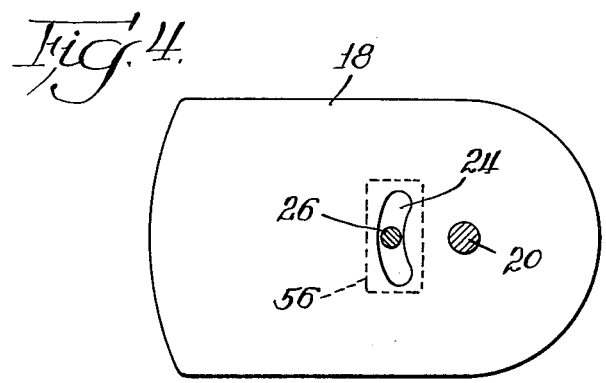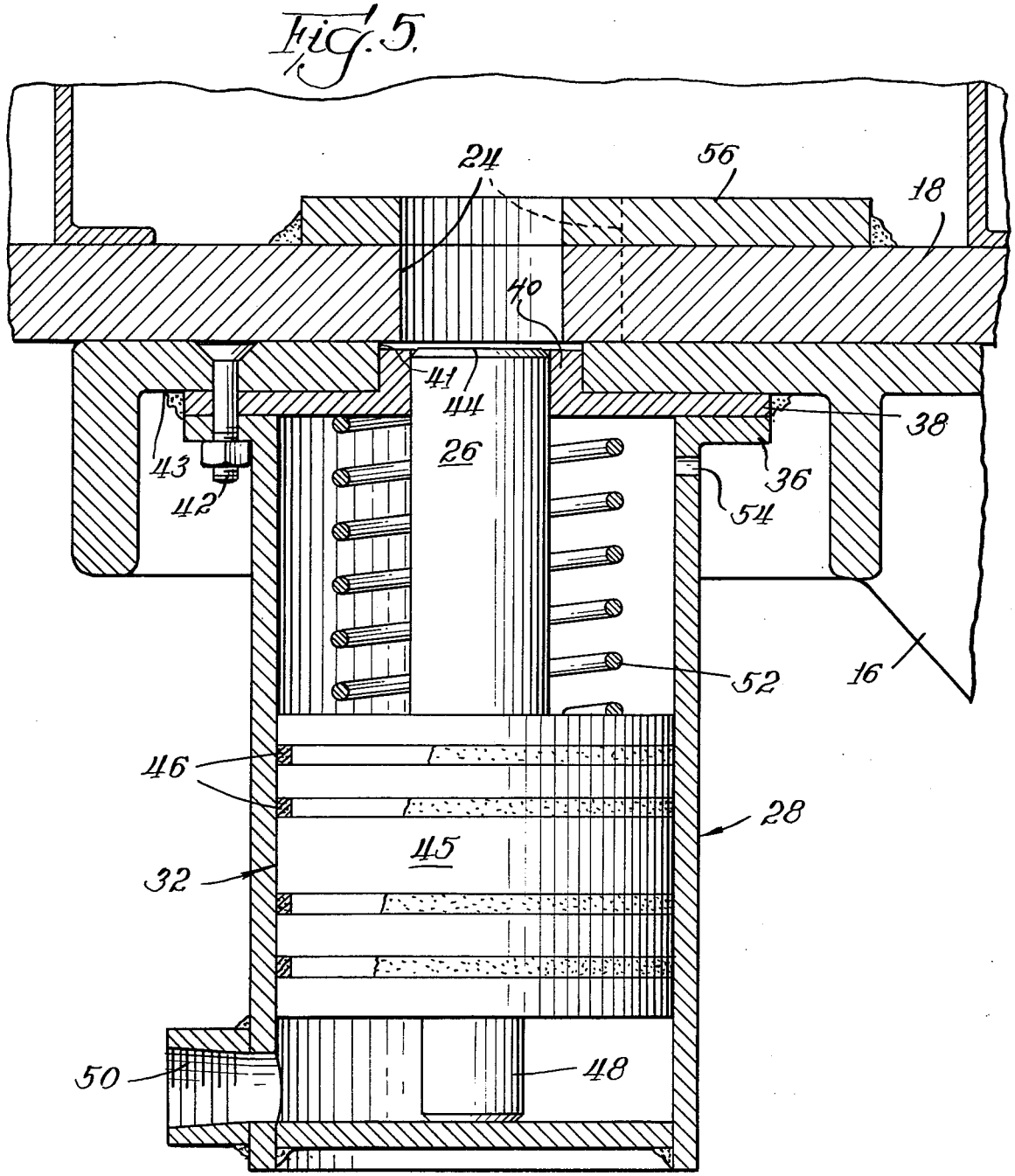

SAFETY DEVICE FOR TRACTOR-TRAILERS TO PREVENT JACKKNIFING

BACKGROUND OF THE INVENTION

Field of the Invention and Prior Art

The invention relates to improvements in tractor-trailer rigs of the fifth-wheel semi-trailer type.

Tractor-trailer rigs having a fifth-wheel coupler and a semi-trailer having a complementary coupler comprising a wear plate and a coupling pin projecting downwardly from the wear plate and providing, when the rig is coupled, an axis about which the rig is articulated, are well known and are commonly preferred to provide an extremely wide angle of articulation. Thus, the tractor, in effect, can be swung from a position at right angles to or past right angles to the center line of the rig around to the other side an equal distance. Thus is necessary in order to make possible the proper maneuvering of the semi-trailer. Thus wide angle of articulation, however, has an undesirable consequence in that the rigs are susceptible to jackknifing under certain circumstances, particularly when the weather is bad and the roads are slick.

OBJECTS OF THE INVENTION

It is an object of the invention to provide an improved tractor-trailer rig. It is a particular object of the invention to provide a tractor-trailer rig in which the danger of jackknifing is minimized. It is a further object of the invention to provide a tractor-trailer rig having all the maneuverability of a rig having a wide angle of articulation with the safety of a rig having a relatively small angle of articlation. It is a further object of the invention to provide simple and rugged means for optionally limiting the angle of articulation. It is a further object of the invention to avoid the disadvantages of the prior art and to obtain such advantages as will appear as the description proceeds.

BRIEF DESCRIPTION OF THE INVENTION

This invention is directed to improvements in a tractor-trailer rig which has a tractor having a fifth-wheel coupler and a semi-trailer having a complementary coupler comprising a wear plate and a coupling pin projecting downwardly from the wear plate and providing, when the rig is coupled, an axis about which the rig is articulated with the angle of articulation sufficiently large to permit maneuvering of the semi-trailer as needed with the undesirable consequence that jackknifing can occur under certain circumstances, which improvements comprise adjustable means adjustable from an inoperative position to an operative position which, in the operative position, limits the angle of articulation sufficiently to eliminate or minimize the danger of jackknifing. Advantageously, actuating means is provided for actuating the adjustable means to and from the operative position, and control means is provided for controlling the actuating means, which control means is located in the cab of the tractor within reach of the driver, so that when the rig is in imminent danger of jackknifing, the driver, through said control means, can actuate the actuatable means to operative position and thus obviate the danger of jackknifing.

Advantageously, the adjustable means comprises a lost-motion connection between the fifth-wheel coupler and the wear plate which, in a preferred form of the invention, is embodied in a projectable pin carried by the fifth-wheel coupler and a complementary slot in the wear plate, the ends of which are adapted to be engaged by the projected pin and thus limit the angle of articulation.

Advantageously, the projectable pin is attached to the piston of a pressure fluid cylinder and actuated to the projected position by the pressure fluid in the cylinder. If desired, the piston can be spring-biased to projected position and actuated to the retracted position by the pressure fluid. It is within the scope of the invention, however, for the entire movement of the piston to be controlled by the pressure fluid means, for example, by means of a double acting piston.

Advantageously, the pressure fluid cylinder is mounted on the under surface of the forward portion of the fifth-wheel coupler where it functions as actuating means for actuating the projectable pin to the operative position. In this modification, the fluid pressure line is connected to the fluid pressure source through a valve located in the cab within reach of the driver, so that, when an emergency arises, the valve control can be thrown to actuate the projecting pin to its operative position.

In the preferred form of the invention, the slot in the wear plate is arcuate, but could be rectangular, oval, or other shape. The important thing is that the slot have end portions which are engaged by the projected pin to limit the angle of articulation.

Advantageously, there is provided a reinforcing jam plate on the upper face of the wear plate. This may be a thick piece of armor plate or like metal welded to the wear plate. The arcuate slot just noted, which need not really be arcuate, extends up through this welded reinforcing or jam plate.

In operation, when there is imminent danger of jackknifing occurring, the driver throws the control lever to the position to actuate the projectable pin to its operative position where the pin acts to limit the angle of articulation. In the broader aspect of the invention, however, the projectable pin can be normally engaged and retracted whenever tight maneuvering is required. Also the pin can be triggered in retracted position and the trigger released either manually as desire or automatically when the rig exceeds a certain speed, e.g., 15 to 30 mph or so.

BRIEF DESCRIPTION OF THE DRAWINGS

In the drawings:

FIG. 3 is a partial view taken along lines 3—3 of FIG. 2.

FIG. 4 is a partial view taken along lines 4—4 of FIG. 2.

FIG. 5 is a detailed view in cross-section of the operative parts of the invention.

DETAILED DESCRIPTION OF THE INVENTION

Figure 1:
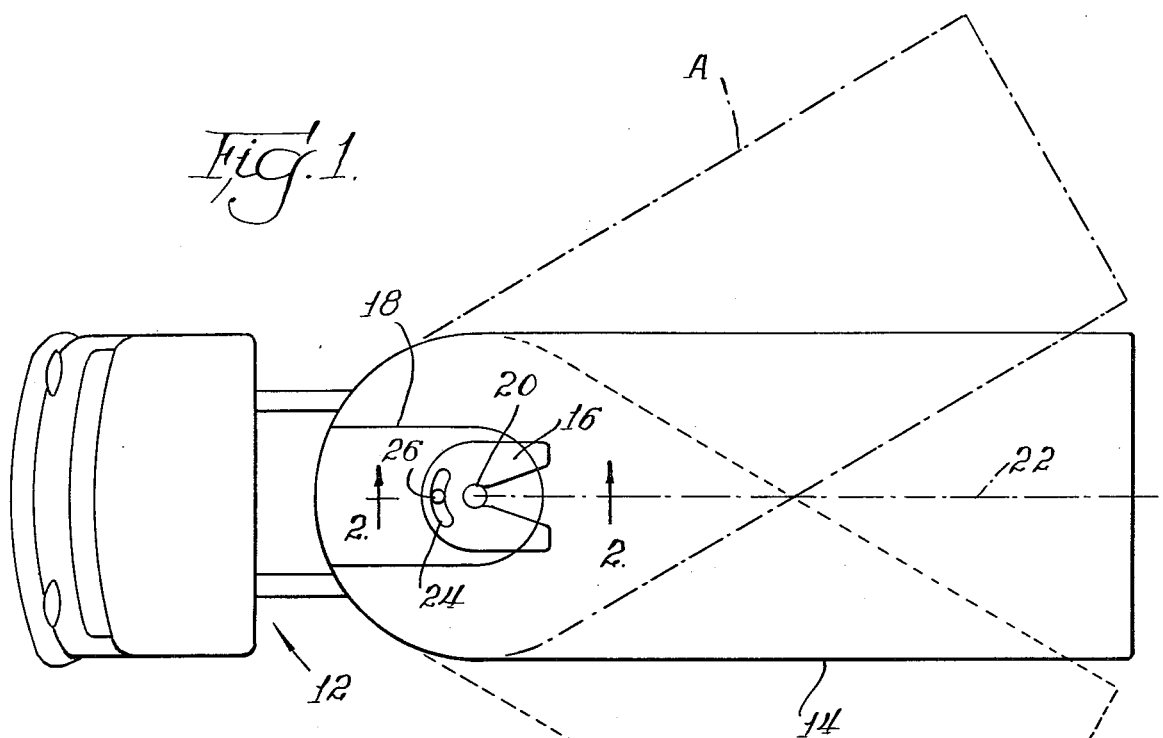
FIG. 1 is a plan view of a tractor-trailer rig according to the invention showing in dotted lines different positions the semi-trailer can assume.

The invention comprises a tractor 12 and a semi-trailer 14. The tractor 12 has a fifth-wheel coupler 16 and the semi-trailer has a complementary coupler comprising a wear plate 18 and a downwardly projecting coupling pin or king pin 20. The couplings are the standard fifth-wheel couplings of the so-called big rigs and provide an articulated unit adapted for rotation about the coupling pin 20 as an axis, as illustrated in FIG. 1.

In order to provide for adequate maneuverability of the semi-trailer, the angle of articulation is at least 180 degrees so that the cab can be swung to one side to a position normal to the center line 22 of the rig, or even past that point. This wide angle of articulation is what is responsible for the susceptibility of the big rigs to jackknifing.

This condition is minimized or avoided by the embodiment of the invention illustrated in the drawings. Thus, the wear plate 18 is provided with an arcuate slot 24 which subtends an angle of not greater than about 30 degrees to each side of the center line 22. A projectable pin 26, when projected into this slot, engages the ends of the arcuate slot and thus limits the angle of articulation to not greater than about 60 degrees or to the position shown in dotted lines at A and B. It will be understood, however, that the angle subtended by the arcuate slot 24 can be less than 60 degrees, that is, less than about 30 degrees to either side of the center line 22, provided only that the angle is sufficient to provide for proper maneuverability on the highway.

Figure 2:
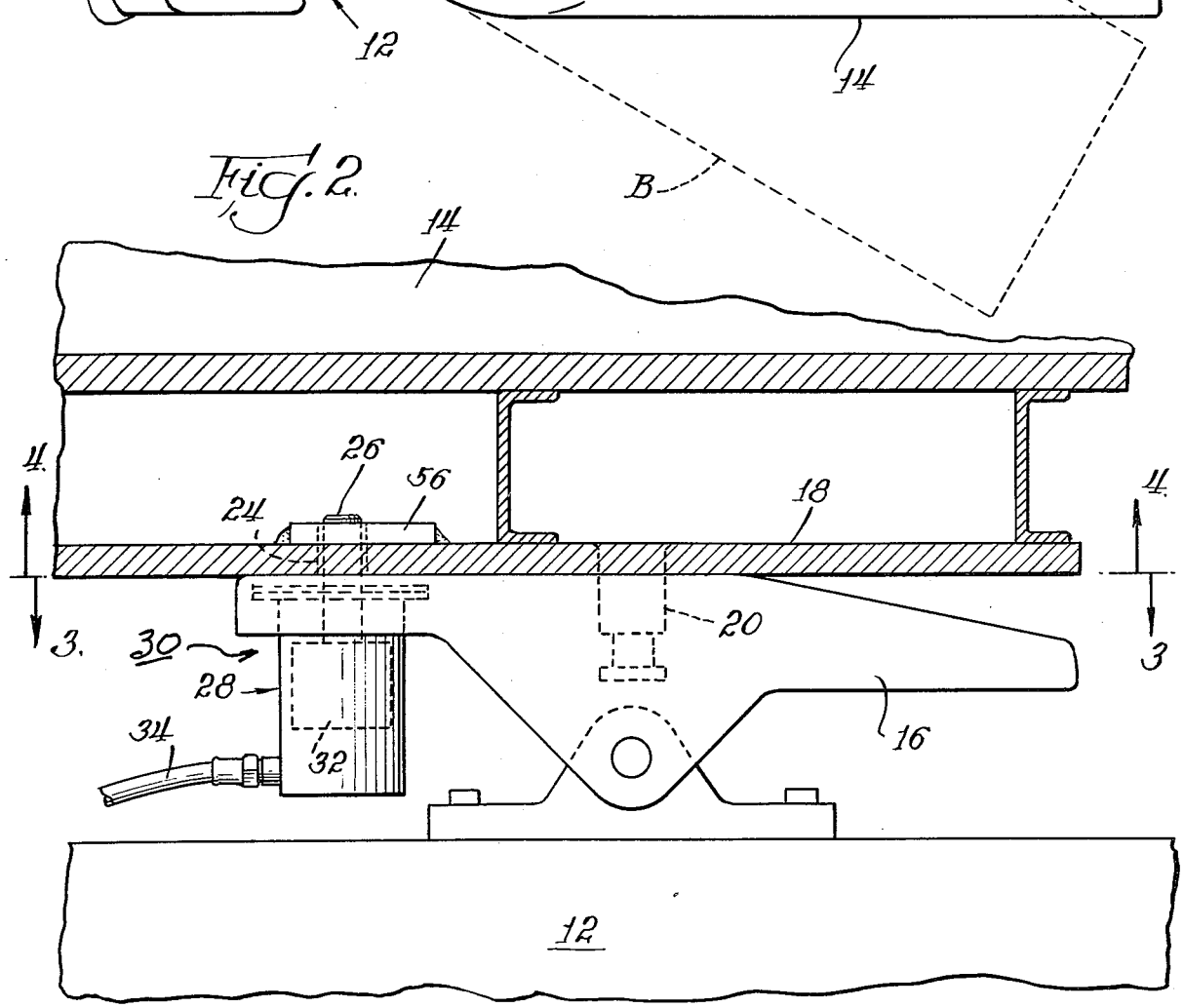
FIG. 2 is a fragmentary side view with parts in section.

The projectable pin 26 is projected into the arcuate slot 24 by a pressure fluid cylinder 28 which is attached to the forward under surface of the fifth-wheel coupler 16 as shown at 30. The projectable pin 26 is carried by the piston 32 of the pressure fluid cylinder 28 and is actuated to the projected position by the fluid pressure admitted through the fluid pressure line 34. The fluid pressure line 34 is connected to a fluid pressure source, not shown, through a control valve, not shown, located in the cab of the tractor within reach of the driver so that the projectable pin 26 can be actuated to projected position shown in FIG. 2 by the driver operating the control lever in the cab.

In FIG. 5 there is shown details of the construction of the pressure fluid cylinder 28. The cylinder is provided with an annular flange 36 at the top and a cover 38. The cover 38 has a central bore for receiving the projectable pin 26 and may have an upstanding collar 40 adapted to be inserted into a complementary bore 41 in the fifth-wheel coupler 16. By means of bolts 42, the pressure cylinder 28 and the cover 38 are bolted to the under surface 43 of the fifth-wheel coupler 16.

The top 44 of the projectable pin 28 is below or flush with the top surface of the fifth-wheel coupler 16 and the bottom is attached to the piston 45 having the usual piston rings 46. The piston, if desired, may be provided with a bottom stud 48 to keep the piston spaced from the bottom of the cylinder. Pressure fluid inlet/outlet means 50 is provided to connect pressure fluid line 34 and to admit pressure fluid into the space provided by stud 48.

A coil spring 52 is interposed between the piston 44 and the cover 38 to bias the piston to retracted position. An air vent 54 is provided to permit the escape of air when the piston is actuated to projected position.

Since the wear plate 18 sometimes becomes excessively thin due to wear, there is provided a jam plate 56 which is welded to the top of the wear plate 18, so that there will always be ample strength provided to limit the angle of articulation independently of how thin the wear plate 18 may have become. The arcuate slot 24 extends upwardly through the wear plate and through the jam plate 56. It will be understood, however, that the slot in the wear plate 18 may be larger so that contact between the projectable pin 26 and the semi-trailer is made only through the jam plate 56. Advantageously, however, the slots in the jam plate and the wear plate are coincident so that they reinforce one another.

In the operation of the device, when the driver senses a condition of danger in which jackknifing is possible or imminent, he will throw the switch or valve lever in the cab which will cause the projectable pin 26 to be projected into the arcuate slot 24 and thus limit the articulation possible to that shown in FIG. 1. The possibility of jackknifing is then either entirely eliminated or greatly minimized.

It is to be understood that the invention is not to be limited to the exact details of operation or structure shown and described, as obvious modifications and equivalents will be apparent to one skilled in the art.

I claim:

1. In a tractor-trailer rig which comprises a tractor having a fifth-wheel coupler and a semi-trailer having a complementary coupler comprising a wear plate and a coupling pin projecting downwardly from said wear plate and providing, when the rig is coupled, an axis about which the rig is articulated with the angle of articulation being sufficiently large to permit maneuvering of the semi-trailer as needed, with the undesirable consequence that jackknifing can occur under certain circumstances, and adjustable means adjustable from an inoperative position to an operative position, said adjustable means in the operative postion limiting the angle of articulation sufficiently to eliminate or to minimize the danger of jackknifing, the combination therewith in which said adjustable means comprises a pressure fluid cylinder which has its top affixed to the undersurface of said fifth-wheel coupler and which is adapted to project a pin up through a bore in said fifth-wheel coupler and then through an enlarged aperture in said wear plate, said pressure fluid cylinder having a collar integral with the top of said cylinder which surrounds said pin and projects up into said bore in a close complementary fit to a point near but not above the upper surface of said fifth-wheel coupler, said enlarged aperture having stops circumferentially displaced from said pin, so that the rotation of said tractor relative to said trailer is limited by said stops when said pin is in the projected position, whereby the thrust on said pin, resulting from it engaging one of said stops, is transferred to said fifth-wheel coupler through said collar.

2. The tractor-trailer rig of claim 1, in which the ends of said aperture comprises said stops.

3. The tractor-trailer rig of claim 1, in which the projectable pin is connected to the piston of said fluid pressure cylinder, which piston is actuated to retracted position by spring-bias and to projected position by pressure fluid means.

4. The tractor-trailer rig of claim 1, in which the pressure fluid cylinder is fastened to the under surface of said fifth-wheel coupler by removable fasteners, said collar acting to prevent the thrust of said pin from being transferred to said fasteners.

5. The tractor-trailer rig of claim 2, in which the wear plate is reinforced by a jam plate welded on the upper face thereof and in which both the wear plate and jam plate comprise said stops.

6. The tractor-trailer rig of claim 2, in which the slot is arcuate and subtends an angle not greater than about 30° on each side of the center line of the rig.

7. The tractor-trailer rig of claim 5, in which the slot is arcuate and subtends an angle not greater than about 30° to each side of the center line of the rig.

8. The tractor-trailer rig of claim 5, in which said enlarged aperture is an arcuate slot concentric with said coupling pin and in which said jam plate comprises an arcuate slot complementary thereto.

9. The tractor-trailer rig of claim 8, in which the jam plate is made of tough shock-resistent steel.

10. The tractor-trailer rig of claim 9, in which said steel is armor plate.

* * * * *

UNITED STATES PATENT AND TRADEMARK OFFICE
CERTIFICATE OF CORRECTION

PATENT NO. : 4,120,514
DATED : October 17, 1978
INVENTOR(S) : Sanders

It is certified that error appears in the above-identified patent and that said Letters Patent are hereby corrected as shown below:

Col. 1, line 18; "Thus" should read --This--
Col. 1, line 20; "Thus" should read --This--
Col. 1, line 34; "articlation" should read --articulation--

Signed and Sealed this

Sixth Day of February 1979

[SEAL]

Attest:

RUTH C. MASON
*Attesting Officer*

DONALD W. BANNER
*Commissioner of Patents and Trademarks*